(12) United States Patent
Thum et al.

(10) Patent No.: US 6,644,106 B2
(45) Date of Patent: Nov. 11, 2003

(54) THERMAL DETECTION OF STANDING WAVES

(75) Inventors: Tuck Foo Thum, Uniontown, OH (US); John Michael Fenkanyn, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/848,629

(22) Filed: May 3, 2001

(65) Prior Publication Data

US 2002/0162398 A1 Nov. 7, 2002

(51) Int. Cl.[7] .............................................. G01M 17/02
(52) U.S. Cl. ............................... 73/146; 73/702; 73/703
(58) Field of Search ........................ 73/700, 701, 702, 73/703, 708, 146, 146.2, 146.3, 146.4, 146.5, 146.8, 570

(56) References Cited

U.S. PATENT DOCUMENTS

| | | | | | |
|---|---|---|---|---|---|
| 4,348,898 | A | * | 9/1982 | Stan ............................ | 374/124 |
| 4,875,176 | A | * | 10/1989 | Harsch et al. ............... | 702/135 |
| 5,095,744 | A | * | 3/1992 | Macecek et al. .............. | 73/146 |
| 5,297,424 | A | * | 3/1994 | Sackett ........................ | 73/146.5 |
| 6,089,750 | A | * | 7/2000 | Murakami et al. .......... | 374/124 |
| 6,226,933 | B1 | * | 5/2001 | Nelson et al. ................ | 52/101 |
| 6,274,859 | B1 | * | 8/2001 | Yoshino et al. ............. | 219/746 |
| 6,438,255 | B1 | * | 8/2002 | Lesniak ....................... | 382/107 |

* cited by examiner

*Primary Examiner*—Edward Lefkowitz
*Assistant Examiner*—Andre Allen
(74) *Attorney, Agent, or Firm*—Richard B. O'Planick; David E. Wheeler

(57) ABSTRACT

A thermal detecting device can be used to detect standing waves in a tire. A one degree F. differential has been found to exist between the high flexing points and the low flexing points in a standing wave, and thermal imaging can be used to map the wave. Information on the standing waves can be used by the tire designer to improve a design.

11 Claims, 3 Drawing Sheets

THERMAL DETECTION OF STANDING WAVES

FIELD OF THE INVENTION

The invention relates to the use of a thermal detecting device to detect standing waves in a tire.

BACKGROUND OF THE INVENTION

In the development of a tire, many tools are used to confirm the viability of proposed tire constructions before new constructions or designs are committed to production. One such tool is the detection of standing waves in a tire. Standing waves are sinusoidal in nature, and are an indication of the expenditure of energy and stresses placed on a tire being focused on certain locations in the tire. Standing waves develop at certain speeds or inflations as the tire is tested and may fluctuate between severe and non-severe amplitudes depending on the testing speeds. In the prior art, the method to detect standing waves comprised the use of moire images, i.e., images created using interferometry. In the prior art, such waves are detected at speeds between 90 and 105 miles per hour, and until the present invention, it was believed that these standing waves did not form until these speeds were achieved. Accordingly, in evaluating a tire construction or design, preliminary testing on new designs sometimes included high speed testing for the purpose of creating shadow moire images.

The detection of the standing waves, the speed at which they occur, and their severity, are information used by the tire designer in modifying his design to reduce or eliminate the problem. Standing waves may cause a tire to fail prematurely.

The high speed equipment needed in the creation of shadow moire images, and the equipment needed to analyze the shadow moire data are very sophisticated and expensive. Although it may be that shadow moire testing, to a certain extent, will always have value, there is the need in the art for alternative testing which may be less expensive and, if possible, produces data that may be more easily analyzed. Other methods may at least supplement the data that can be obtained from shadow moire images.

SUMMARY OP THE INVENTION

A method for detecting standing waves in a rotating tire comprises the steps of (a) using a thermal detecting device to obtain a temperature profile of a rotating tire, and (b) analyzing thermal patterns in the data. The method may include using hardware and software for automating data capture and analysis. In the illustrated embodiment, a high speed infrared camera was used for obtaining thermal images. It has been found that a thermal difference between the valley and the peak of a standing wave can be detected at 40 mph to 80 mph It is an object of the present invention to provide an apparatus and method for detecting standing waves in a tire at relatively slow speeds.

Further objects of the invention will be apparent from the following description and claims.

BRIEF DESCRIPTION OF THE DRAWINGS

The invention will be described by way of example and with reference to the accompanying drawings in which.

DETAILED DESCRIPTION OF THE INVENTION

The purpose of the invention is to use a thermal detecting device, in the illustrated embodiment high speed infrared thermography to detect and analyze the formation of standing waves in a tire before they can be visually seen. The standing waves appear as bumps or bulges on the tire.

In an automobile tire, as it rotates, the sidewall constantly flexes as the tread moves in and out of the footprint of the tire. The constant flexing of the rubber in the tire creates heat. The zero crossing of the sinusoidal flexing appears different from the flexing occurring at the positive and negative excursions of the sign wave, creating a thermal difference between the areas where the standing waves occur and the rest of the tire sidewall. It has been found in accordance with the present invention that the difference in the heat dissipation in these areas can be detected by a high speed infrared camera.

For the testing described herein, a high speed infrared camera (120 hertz) was used to create the thermal images. Those skilled in the art will recognize that the equipment may be modified depending on the specific requirements of testing being done.

Figure 1:
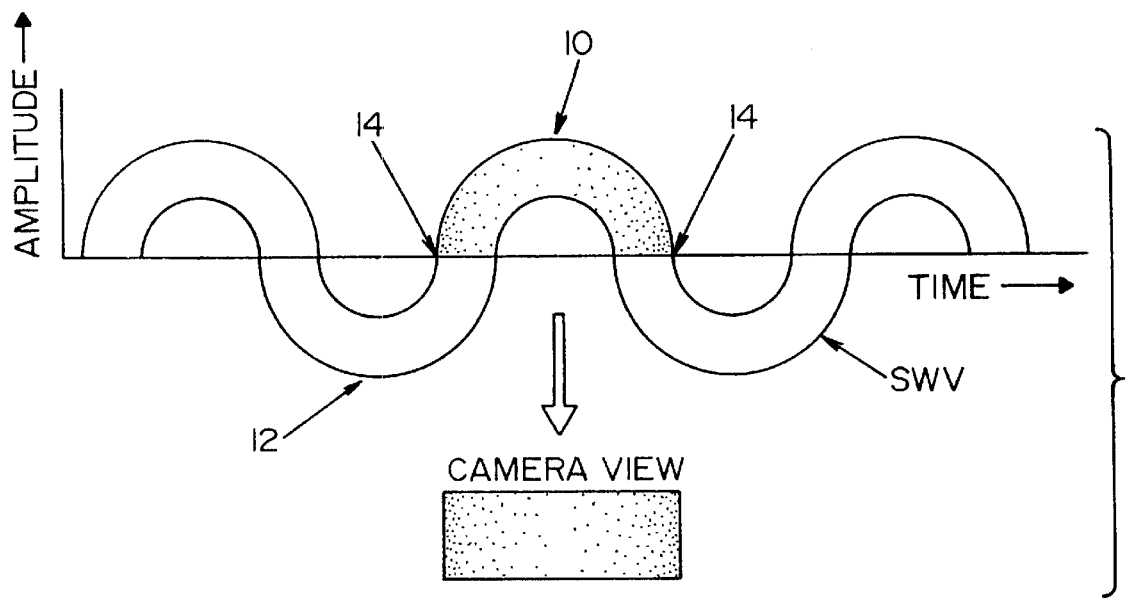
FIG. 1 illustrates a representation of a standing wave.

With reference now to FIG. 1, it is theorized that in a tire, maximum flexing takes place in the peaks 10 and valleys 12 of a standing wave (SWV). The camera view in FIG. 1 illustrates what the IR camera would see when it is perpendicular to a sidewall 18 (FIG. 2) of a tire. The zero point 14 of the sinusoidal wave, in relative terms, is motionless. The peaks and valleys will therefore show up in thermal imaging as the hot spots on a tire sidewall. By this theory, the standing waves will show up as cold spots, or dark spots in the thermal imaging. Further work needs to be done to confirm this theory. Preliminary work has shown a thermal difference that can be used to detect standing waves, but the nature of the thermal difference has not yet been fully characterized.

Initial observations using the apparatus and method of the invention did not detect standing waves in a tire at 50 miles per hour. Since the test requires measuring thermal differences, however, and it takes time to generate heat in a rotating tire, the test was continued for 10 minutes at 50 miles per hour, at which point observation of standing waves could be made, as is illustrated in FIG. 2.

The tire imaged was rotated against a 60 inch high speed test wheel 20 with a load of 1085 pounds at an inflation of 41 pounds per square inch (psi). The tire tested was size P215/60R14. The test was carried out by stepping up the speed of the tire in increments. The tire was run at 50 mph for 10 minutes, 80 mph for 30 seconds, 85 mph for 30 seconds, 90 mph for 30 seconds, 95 mph for 30 seconds, 97 mph for 30 seconds, 99 mph for 30 seconds, 101 mph for 30 seconds, 103 mph for 30 seconds, and 105 mph for 30 seconds.

Figure 2:
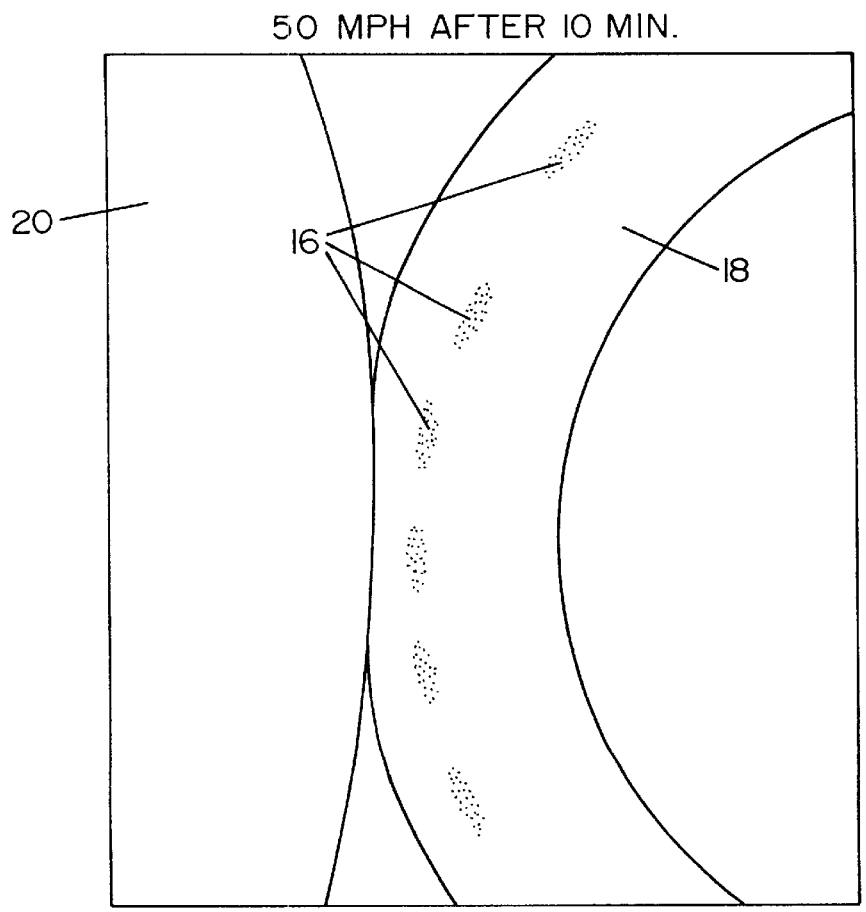
FIG. 2 illustrates standing waves observed according to the invention at 50 miles per hour (mph).

As can be seen in FIG. 2, the standing waves 16 generally develop at regular intervals.

Figure 3:
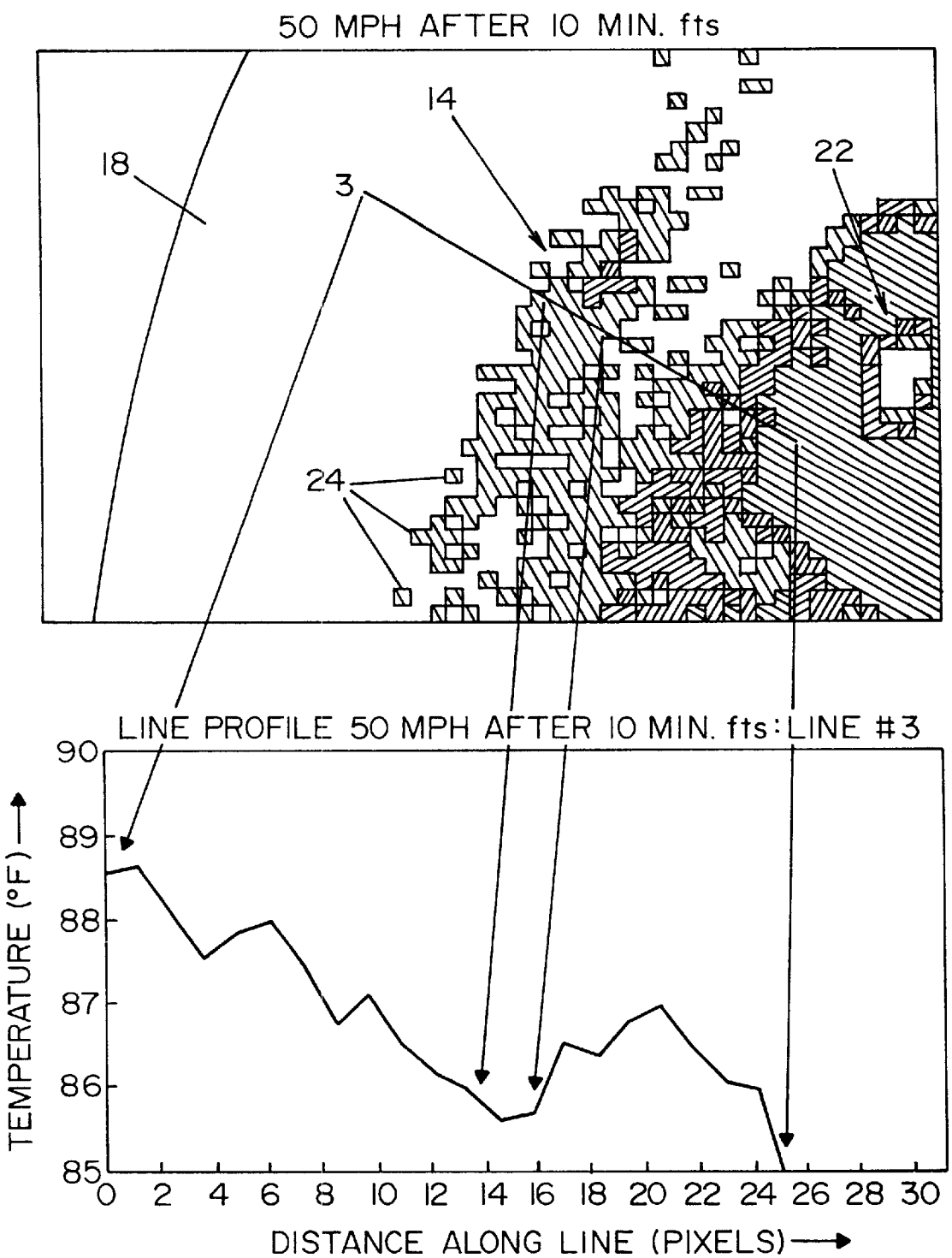
FIG. 3 illustrates a thermograph of a standing wave in a tire at 50 mph.

Using thresholding to enhance thermal contrast of the wave formations, the image obtained at the end of the 50 mph step was enlarged in FIG. 3. A similar enlargement is provided for the image obtained at 105 mph in FIG. 4.

Figure 4:
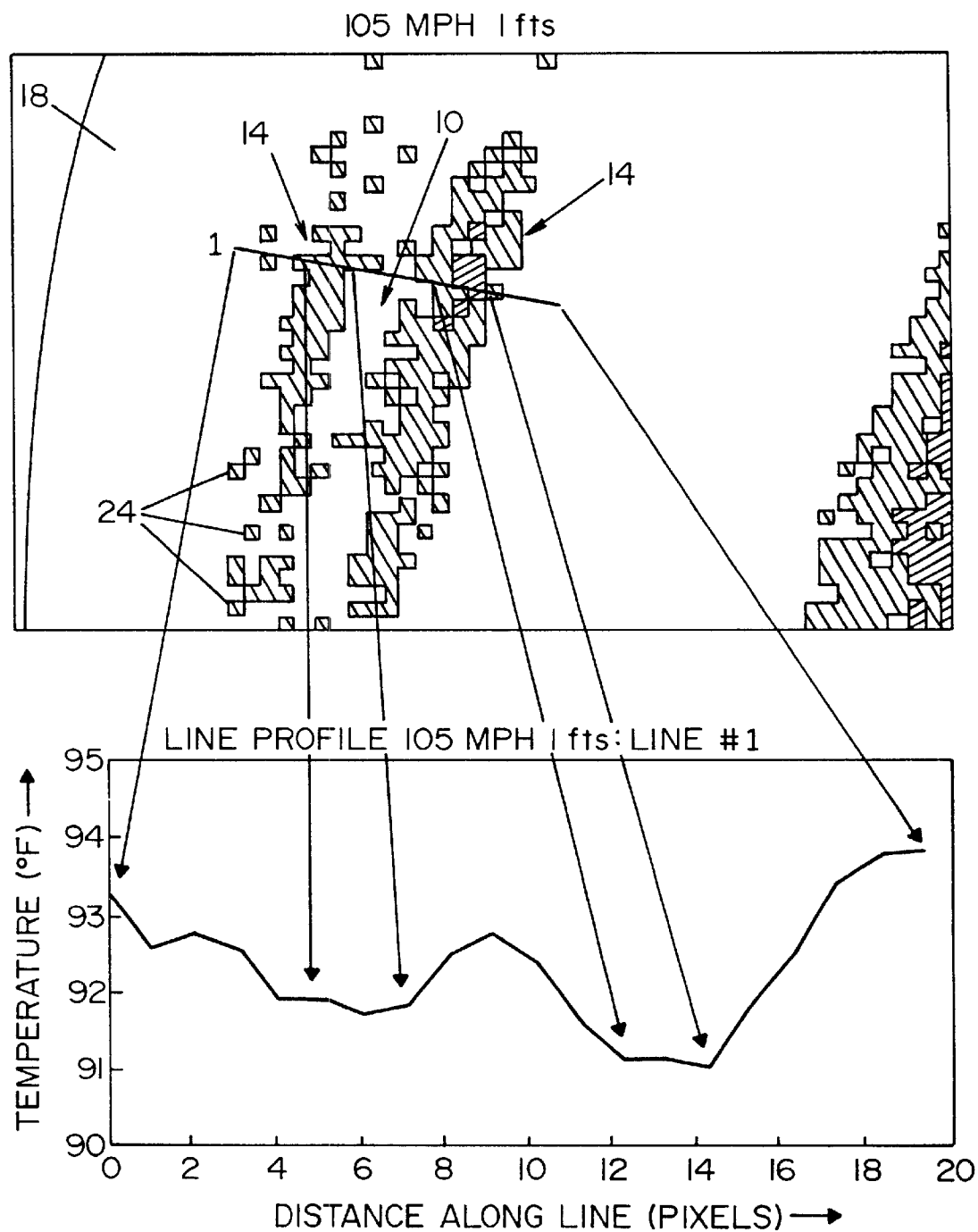
FIG. 4 illustrates a thermograph of a standing wave in a tire at 105 mph.

When standing waves are formed, they appear to maintain a stationary position in the tire, and as the speed increases, additional waves are formed in between existing waves, while the original standing waves maintain their position. With reference to FIGS. 3 and 4, it can be seen that the standing waves at 50 mph and the standing waves at 105 mph are in substantially the same position in the tire, however, in the 105 mph image, two cooler areas 14 are present in the area where one cooler area was present at 50 mph. It is theorized that the peak 10 of the standing wave is present between the two zero points 14 on the wave, and has a thermal gradient similar to the thermal gradient of the rest of the tire sidewall 18. The lettering 22 obstructs what may be the second standing wave in the image made at 50 mph, whereas the effect of the lettering on the imaging at 105 mph is minimized by the increased temperature obtained at higher speeds.

As can be seen in FIG. 3, the image can be broken down into pixels 24, and the thermal properties of the pixels can be analyzed to accurately map the thermal properties of the standing wave in the sidewall of the tire. The temperature scale was fixed across the images to aid in visualizing the heating up of the tire as the speed increased.

With reference now to FIG. 4, the test of the tire was continued up to 105 mph so that data obtained by infrared thermography could be compared with shadow moire data, in order to confirm that the standing waves detected by infrared thermography coincide with standing waves detected by Shadow Moire techniques. The infrared thermography of the tire at 105 mph, illustrated in FIG. 4, shows a temperature differential of about 1° F. between the cool spots and the rest of the sidewall. If the theory that the zero point 14 of a standing wave is cooler than the peak area of the waves is true, the cool spots representing the standing wave provide a profile of the standing wave.

Although the tire runs hotter at 105 mph than it does at 50 mph, the temperature differential between the cooler areas and the hotter areas is 1° F. in each case.

Preliminary comparisons confirm that Shadow Moire images conform substantially in location and size with the images detected by infrared thermography at 50 mph. Further testing needs to be done to confirm and fully characterize wave development.

Although, in the proof of concept illustrated herein, commercially available hardware and software were used to create the thermal images and analyze the images, it is anticipated that hardware and software can be optimized to automate the data capture and analysis to create an infrared standing wave test system.

The invention can be used as a tool by the tire designer to make decisions on design changes based on the speed at which the waves are detected in order to reduce standing wave formations. Detecting the standing waves at lower speed steps gives the tire designer a more accurate view of the tire properties.

While the invention has been specifically illustrated and described, those skilled in the art will recognize that the invention can be variously modified and practiced without departing from the spirit of the invention. The invention is limited only by the scope of the following claims.

What is claimed is:

1. A method for analyzing thermal differences in a rotating tire comprising the steps of:
   (a) using a thermal detecting device to detect the presence, form, and location of standing waves based upon thermal differences within a tire wall tire;
   (b) obtaining a tire wall temperature profile of the rotating tire from the detected presence, form, and location of thermal differences;
   (c) analyzing thermal data obtained; and
   (d) creating a thermal image based upon heat dissipation in the tire wall.

2. The method of claim 1 which comprises the further step of using hardware and software for automating data capture and analysis.

3. The method of claim 1 comprising the step of using a high speed infrared camera for obtaining thermal images.

4. The method of claim 1 comprising the step of detecting a thermal difference between the valley and the peak of a standing wave at 40 mph to 80 mph.

5. A method for analyzing heat dissipating properties within a tire wall in a rotating tire comprising the steps of:
   (a) using a thermal detecting device to obtain profile data of flexure-induced thermal differences within the tire wall;
   (b) creating a thermal image of the heat dissipation within the tire wall.

6. A method according to claim 5 comprising the further step of using the profile data to detect standing waves in the rotating tire.

7. A method according to claim 5 wherein creating the thermal image of the heat dissipation within the tire wall comprises creating the thermal image of the heat dissipation within a sidewall region of the rotating tire.

8. A method according to claim 5, wherein using the thermal detecting device comprises detecting thermal differences within the tire wall resulting from wall flexure.

9. A method according to claim 8, wherein using the thermal detecting device comprises detecting thermal differences within a sidewall region of the rotating tire.

10. A method according to claim 5, wherein creating the thermal image comprises mapping the thermal properties of a standing wave in the sidewall of the tire.

11. A method according to claim 5, wherein the creating the thermal image comprises mapping the random presence, form, and location of a flexure-induced standing wave in the sidewall of the tire.

* * * * *